United States Patent [19]

Leining

[11] Patent Number: 4,662,028
[45] Date of Patent: May 5, 1987

[54] APPARATUS FOR SPLITTING ANIMAL HEADS

[75] Inventor: Lyndon R. Leining, Austin, Minn.

[73] Assignee: Geo. A. Hormel & Co., Austin, Minn.

[21] Appl. No.: 886,882

[22] Filed: Jul. 18, 1986

[51] Int. Cl.$^4$ .............................................. A22B 5/20
[52] U.S. Cl. ........................................ 17/1 R; 17/23
[58] Field of Search ............... 17/23, 24, 1 R; 83/412, 83/414, 221, 564

[56] References Cited

U.S. PATENT DOCUMENTS 3,776,078  12/1973  Perlman ................................ 83/221
4,359,807  11/1982  Adkison et al. ....................... 17/1 R Primary Examiner—Willie G. Abercrombie
Attorney, Agent, or Firm—Herman H. Bains

[57] ABSTRACT

An apparatus for splitting the heads of animals comprises a conveyor including a plurality of head support members. Indexing drive means move the conveyor in incremental steps to successively advance each head support member to a cutting station. A stop means is provided for releasably locking the conveyor against movement and to precisely position a head support member at the cutting station. A shiftable cutting device is operable to split each head in half when each head is positioned at the cutting station.

12 Claims, 11 Drawing Figures

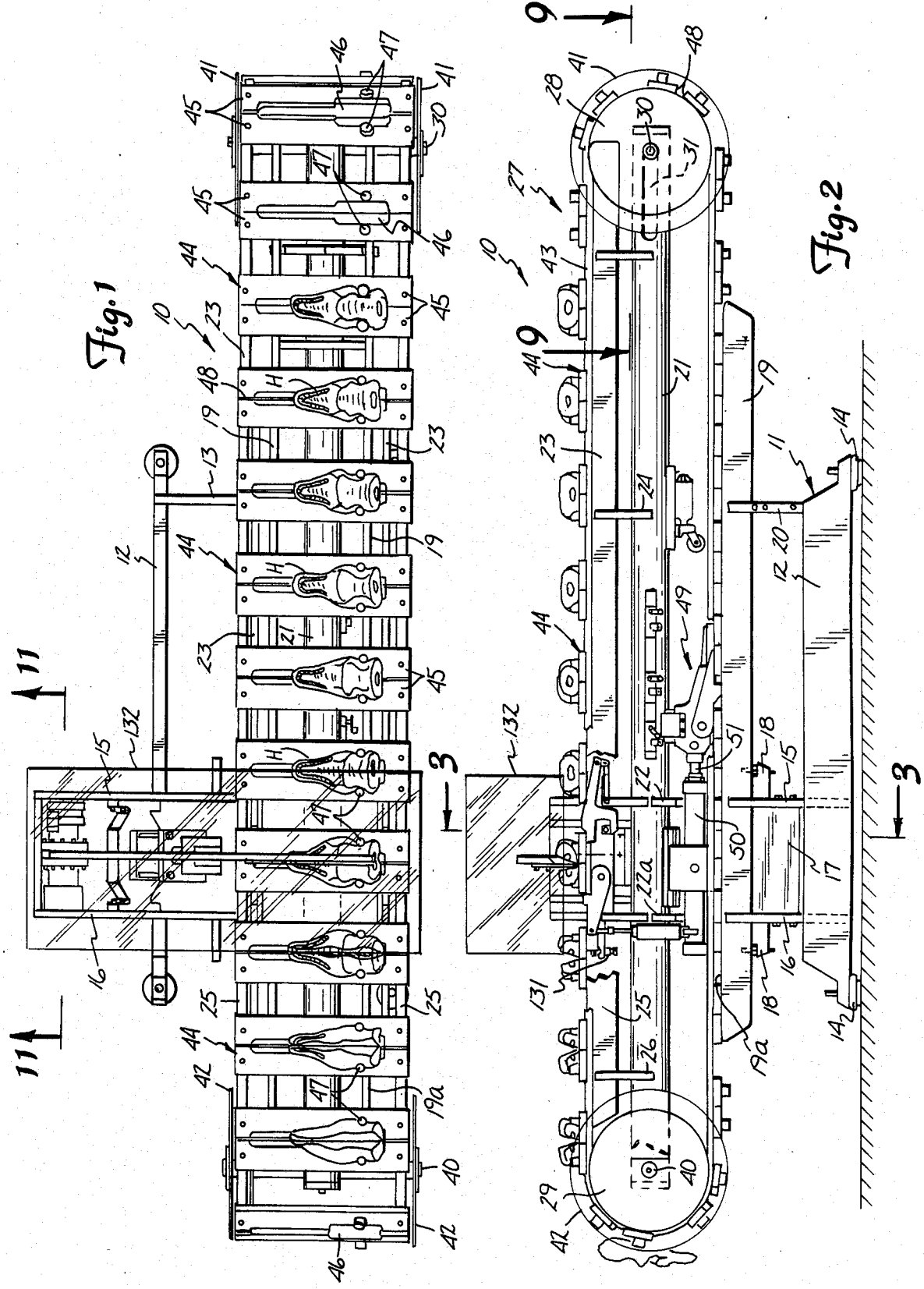

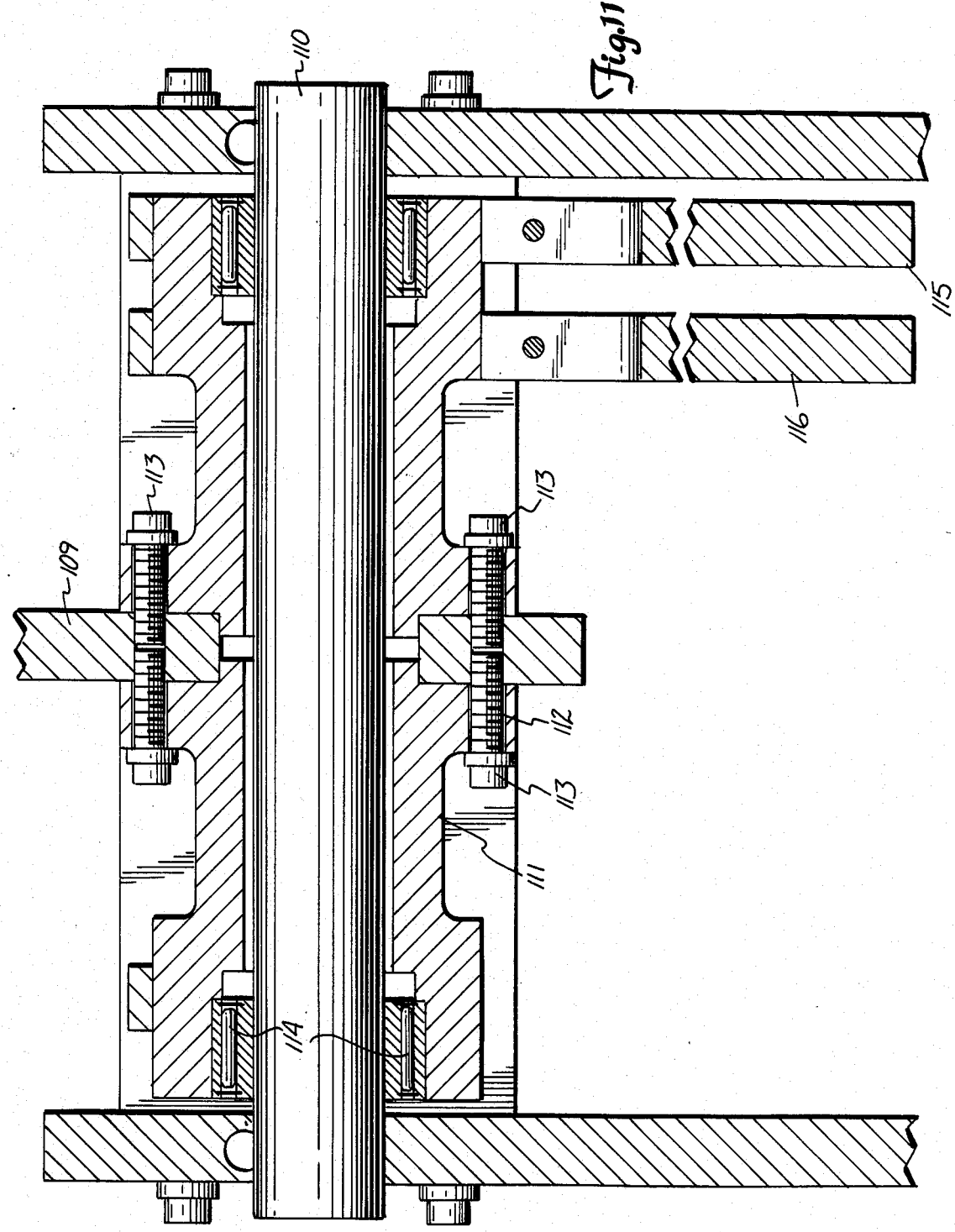

APPARATUS FOR SPLITTING ANIMAL HEADS

This invention relates to a device for splitting animal heads, such as hog heads, to provide access to the tissue contained therein.

BACKGROUND OF THE INVENTION

In most meat packing operations, not only are the primal cuts of slaughter animals of commercial value, but substantially all animal tissue has some commercial value. For example, the brain tissue and glands in hog heads are of importance as a source of hormones and other pharmaceutical compounds. The skull or head must be split in order to provide access to this important tissue. Although certain equipment is used in meat packing plants to split hog heads and the like, such equipment is not capable of accurate high production performance.

SUMMARY OF THE INVENTION

It is an object of this invention to provide an apparatus, of simple and inexpensive construction, for precisely splitting animal heads to permit access to the brain tissue and glandular tissue contained therein.

A more specific object of this invention is to provide a novel head splitting apparatus having an endless conveyor upon which the animal heads are placed and successively conveyed to a cutting station where the animal skulls are successively split by a cutting device.

Another object of this invention is to provide a novel improved animal head splitting device in which the conveyor mechanism which supports the animal heads is shifted by indexing drive means to successively and precisely position each head in a predetermined position for splitting by a cutting device.

FIGURES OF THE DRAWING

FIG. 1 is a top plan view of the novel head splitting apparatus;

FIG. 2 is the side elevational view thereof;

FIG. 11 is a cross-sectional view taken approximately along lines 11—11 of FIG. 1.

DESCRIPTION OF THE PREFERRED EMBODIMENT

Figure 3:
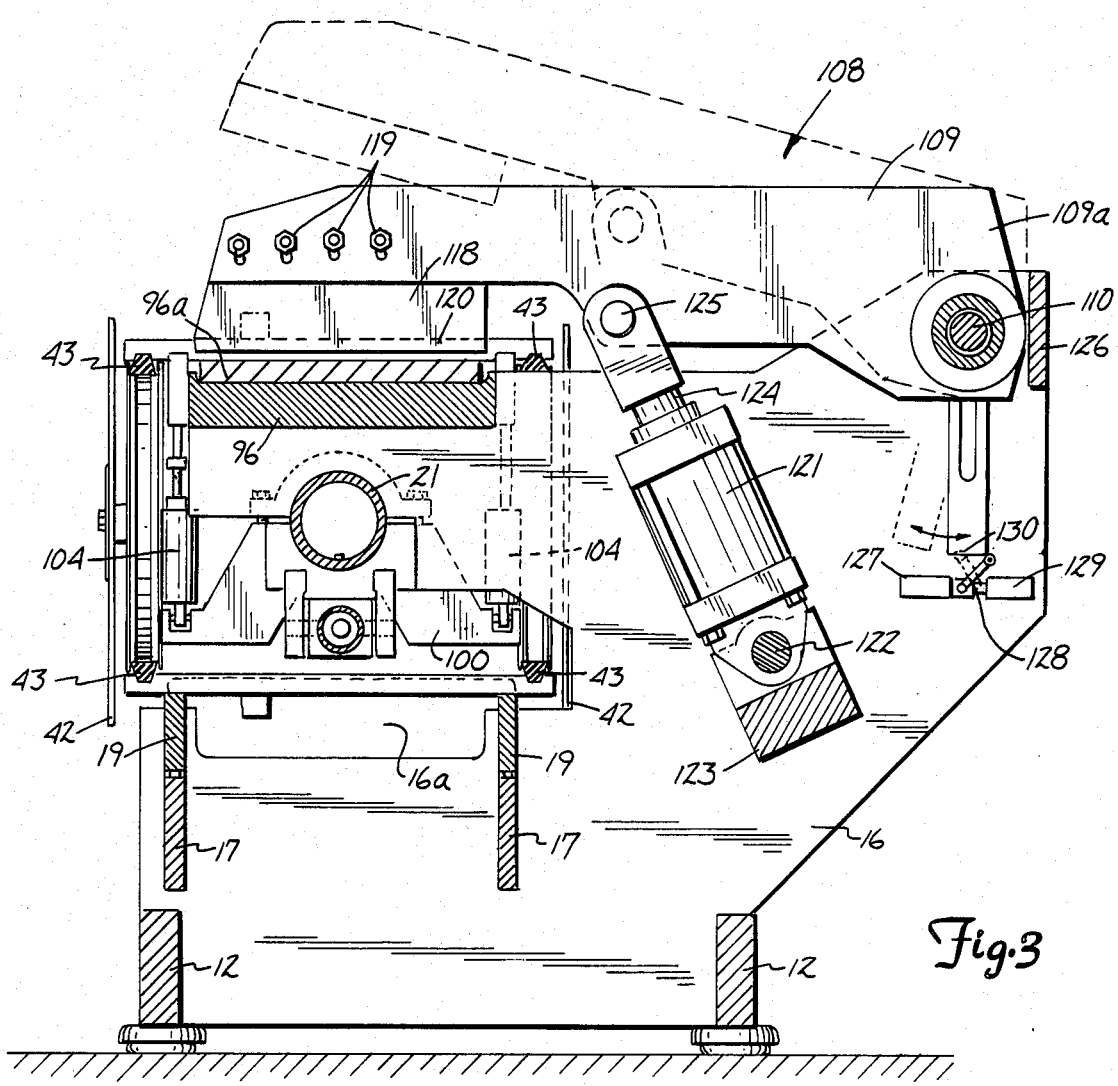
FIG. 3 is a cross-sectional view taken approximately along the lines 3—3 of FIG. 2 and looking in the direction of the arrows.
Figure 9:
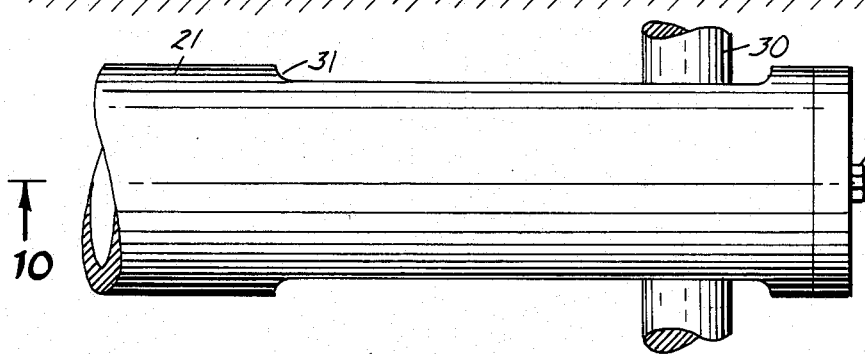
FIG. 9 is a cross-sectional view taken approximately along the lines 9—9 of FIG. 2 and looking in the direction of the arrows.
Figure 10:
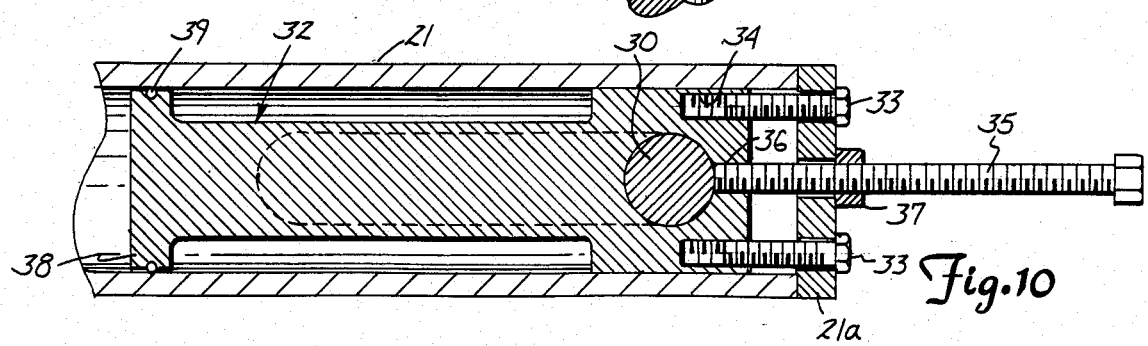
FIG. 10 is a cross-sectional view taken approximately along the lines 10—10 of FIG. 9 and looking in the direction of the arrows.

Referring now to the drawings and, more specifically, to FIGS. 1, 2, and 3, it will be seen that one embodiment of the novel head splitting apparatus, designated generally by the reference numeral 10, is there-shown. The head splitting apparatus 10 includes a support frame 11 which is comprised of laterally spaced apart longitudinally extending base members 12. Each base frame member 12 is provided with vertically adjustable foot elements 14 at its ends which engage the floor of a building. It will also be seen that the longitudinally extending base frame members 12 are rigidly interconnected by a transverse frame member 13. The support frame 11 also includes a transversely extending rear vertical frame plate 15 and a transversely extending front vertical frame plate 16 which are longitudinally spaced apart from each other and are rigidly connected to the longitudinally extending base frame members 12.

Referring now to FIG. 3, it will be seen that the vertical frame plate 16 has an opening 16a in one side portion thereof, and it is pointed out that rear vertical frame plate 15 has an opening therein substantially identical to the opening 16a and disposed in registering relation therewith. The support frame 11 includes a pair of vertical side plates 17 which extend between the rear frame plate 15 and front frame plate 16. Each side plate 17 has a pair of extensions 18, each projecting from one end thereof through a slot in the front and rear frame plates. The extensions 18 of each side plate are connected by suitable nut and bolt assemblies to an elongate, longitudinally extending lower slide support 19 having a substantially flat upper surface 19a. The slide supports 19 are formed of Delrin and each provides a support for the conveyor device to be described hereinbelow. A vertical post 20 also extends between and is connected to one of the base frame members and one of the lower slide supports 19 by adjustable nut and bolt assemblies. Although not shown in the drawing, the other lower slide support 19 is connected to a post by suitable nut and bolt assemblies, the post being connected to the transverse frame member 13. It is pointed out that the nut and bolt assemblies connecting the lower slide supports to the extensions 18 and to the posts are adjustable to adjust the height of each lower slide support.

The support frames 11 also include an elongate longitudinally extending central tubular frame member 21 whose length extends substantially throughout the general overall length of the machine. The tubular frame member 21 extends through the openings in the frame plates 15, 16 and is rigidly secured to the frame plate 15 by a bracket 22 and to the frame plate 16 by a bracket 22a, as best seen in FIG. 2. These brackets engage the tubular frame member 21 and are secured to the associated frame plate by suitable bolts. The central frame member 21 is rigidly secured to a pair of parallel, laterally spaced apart, longitudinally extending, rear upper slide supports 23 by suitable posts 24, as best seen in FIG. 2. The central frame member is also secured to a pair of longitudinally extending laterally spaced apart substantially parallel front upper slide supports 25 by suitable posts 26. It will be appreciated that one of the rear upper slide supports 23 is disposed in substantial alignment with one of the front upper slide supports 25. These slide supports are also formed of Delrin, and each has a substantially straight level upper surface which provides a support for the upper run of a conveyor device 27.

The conveyor device 27 includes a pair of rear pulleys 28 and a pair of front pulleys 29 which are revolvably mounted on the tubular frame member 21. In this regard, the pair of rear pulleys 28 are journaled on an elongate pulley axle 30 by suitable bearings (not shown) for rotation relative thereto. In the embodiment shown, the pulley axle 30 projects through opposed slots in the central frame member 21 and also projects through an opening in an elongate slide block 32. The slide block 32 is secured to the end cap 21a of the tubular frame member 21 by suitable bolts 33 which extend through openings in the end cap. The bolts 33 threadedly engage threaded recesses 34 in the slide block 32.

A removable adjustment bolt 35 projects through a central opening in the end cap 21a and is adapted to engage a threaded recess 36 in the slide block. A lock nut 37 is provided for retaining the slide block in an adjusted relation produced by the adjustment bolt 35. In this regard, the adjustment bolt may be threaded into the threaded recess 36 in the slide block and the adjustment bolt may be used to adjust the longitudinal position of the slide block and pulley axle 30 relative thereto. When the adjusted position has been reached, the bolts 33, which were previously loosened, may then be adjusted to retain the slide block in an adjusted position. Thereafter, the adjustment bolt may then be removed.

Adjustment of the pulley axle 30 is for the purpose of installing the endless pulley belts. It will also be seen that the inner end portion of the slide block 32 is provided with a radial flange 30a having an annular groove therein for accommodating an O-ring 39. The O-ring forms a water seal to prevent water from accumulating interiorly of the tubular frame member 21.

The front pair of pulleys 29 are journaled on the front pulley axle 40 which projects through openings in the tubular frame member 21 adjacent the front end thereof. It will also be noted that each rear pulley 28 has an enlarged pulley disc 41 rigidly secured to the outer surface thereof by suitable bolts so that each disc rotates with the associated pulley. The discs 41 have a larger diameter than the associated pulley, and each is formed of a suitable plastic material. Similarly, the front pulleys 29 each have a front disc 42 secured to the outer surface thereof by suitable bolts or the like for rotation therewith. The front discs 42 are also of larger diameter than the rear discs and are formed of a suitable plastic material.

A pair of endless conveyor belts 43 are each trained about one of the front pulleys 29 and one the rear pulleys 28. The endless belts are formed of a yieldable material and the two belts are interconnected by a plurality of spaced apart head support members 44. Each head support member is comprised of a pair of substantially flat rectangular shaped elongate transversely extending slats, each being secured at one end thereof to one of the endless belts 43. Each slat is formed of an aluminum material, and each has an elongate recess 46 in the upper surface thereof and along the transversely extending inner edge 48 thereof.

It will be noted that the inner edges 48 of the pair of slats comprising a head support member are disposed in abutting relation at all times, except when the slats move arcuately around the pulleys. It will further be noted that each slat has a knob or spool 47 affixed to the upper surface and projecting upwardly therefrom. It will further be noted in FIG. 1 that each knob 47 is positioned adjacent the recess 46 of the associated slat 45. The head H is positioned in the cooperating recesses 46 in the slats of a head support member and between a pair of knobs 47, as best seen in FIGS. 1 and 2. The head is, therefore, retained in place on the head support members as the upper run of the conveyor is moved to the left, as viewed in FIGS. 1 and 2.

Figure 8:
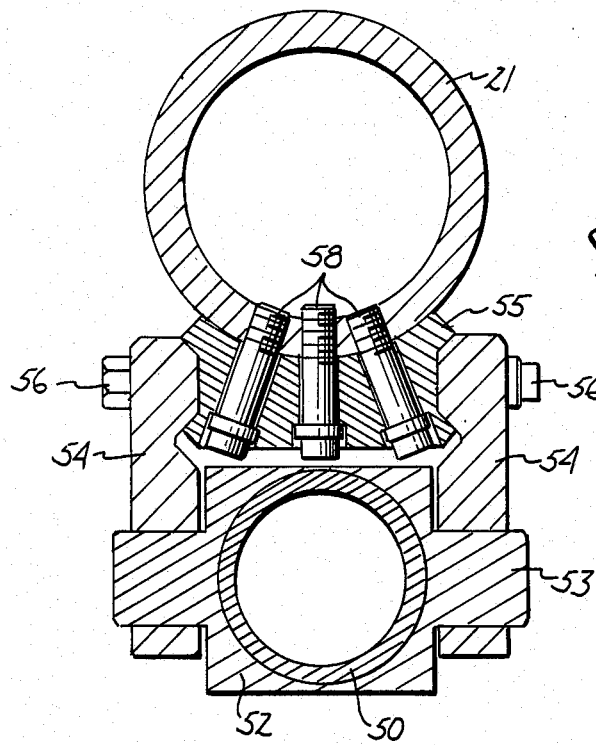
FIG. 8 is a cross-sectional view taken approximately along the lines 8—8 of FIG. 4 and looking in the direction of the arrows.

Indexing means 49 is provided for shifting the conveyor device 27 so that each head supporting member is successively shifted to a cutting station, and this means includes a double-acting hydraulic trunnion cylinder 50 having a piston movable therein to which is connected a piston rod 51. The cylinder 50 is provided with a trunnion block 52, as best seen in FIG. 8, having a pair of trunnions or pivots 53 integrally formed therewith and projecting horizontally outwardly therefrom. The trunnions 53 project through openings in a pair of plates 54, the latter being secured to a mounting block 55 by bolts 56. The mounting block 55 has a pair of opposed slots 57 therein through which the bolts 56 project. The mounting block 55 is secured to the tubular frame member 21 by bolts 58 which threadedly engage in threaded recesses in the tubular member 21. The slots 57 in the mounting block 55 permit longitudinal adjustment of the cylinder 50 relative to the mounting block 55.

The piston rod 51 is connected to a guide support arm 59 by a pivot 60. A slat engaging pawl 61 is pivotally connected to one side of the guide support arm by a pivot 62. It will be noted that the slat engaging pawl 61 has a tapered nose portion 63 having a flat lower surface 64 which engages the upper surface of one of the slats of a head support member 44. The slat engaging pawl 61 also has a downwardly projecting slat engaging dog 65 which is engageable with an edge of a slat of a head support member to permit movement of a conveyor when the piston rod 51 is extended.

The guide support arm 59 is also provided with an elongate flat slat engaging slide member 66 having a flat lower surface which is adapted to engage and slide along the surface of a head support member. The slide member 66 is secured to the guide support arm 59 by suitable bolts or the like. An elongate ramp member 67 is mounted upon the upper surface of the slide member 66 and is secured thereto by suitable bolts, and the ramp member has an inclined upper surface 68, the function of which will be more fully described hereinbelow.

The tubular frame member 21 has a limit switch 69 mounted thereon and the limit switch is provided with a downwardly projecting switch arm 70 having a roller secured to the end thereof. A second limit switch 71 is mounted on the tubular frame member and is spaced longitudinally from the limit switch 69. The limit switch 71 is also provided with a switch arm 72 having a roller mounted on the lower end thereof. A third limit switch 73 is mounted on the tubular frame member 21 in spaced relation with respect to the limit switch 71, and limit switch 73 is also provided with a switch arm 74 having a roller at its lower end.

Means are provided for actuating the limit switches 69, 71, and 73. This means includes an L-shaped cam 75 which is rigidly secured to the guide support arm 59 by suitable bolts. The pawl hold down slider bearing member 76 is also secured to the upper portion of the guide support arm 59 by suitable bolts. It will be noted that slider bearing 76 keeps the pawl mounting block 59 from lifting up as piston rod 51 extends. The switch arm engaging member 75 is positioned so that it will sequentially engage the switch arms 70, 72, and 74 during extension and retraction of the piston rod 51.

It will be seen that, when the piston rod is extended from a retracted position, the dog 65 will engage an edge of a slat of a head support member 44 to thereby cause the conveyor to be shifted so that the upper run thereof is moved to the left, as viewed in FIGS. 1 and 2. During extension of the piston rod 51, the switch arm engaging member 75 will engage the limit switch arms 70, 72, and 74 in a sequential manner. Conversely, when the piston rod 51 is retracted, the switch arm engaging member 76 will sequentially engage the switch arms 74, 72, and 70. This affects the operational sequence of the head splitting apparatus.

Figure 4:
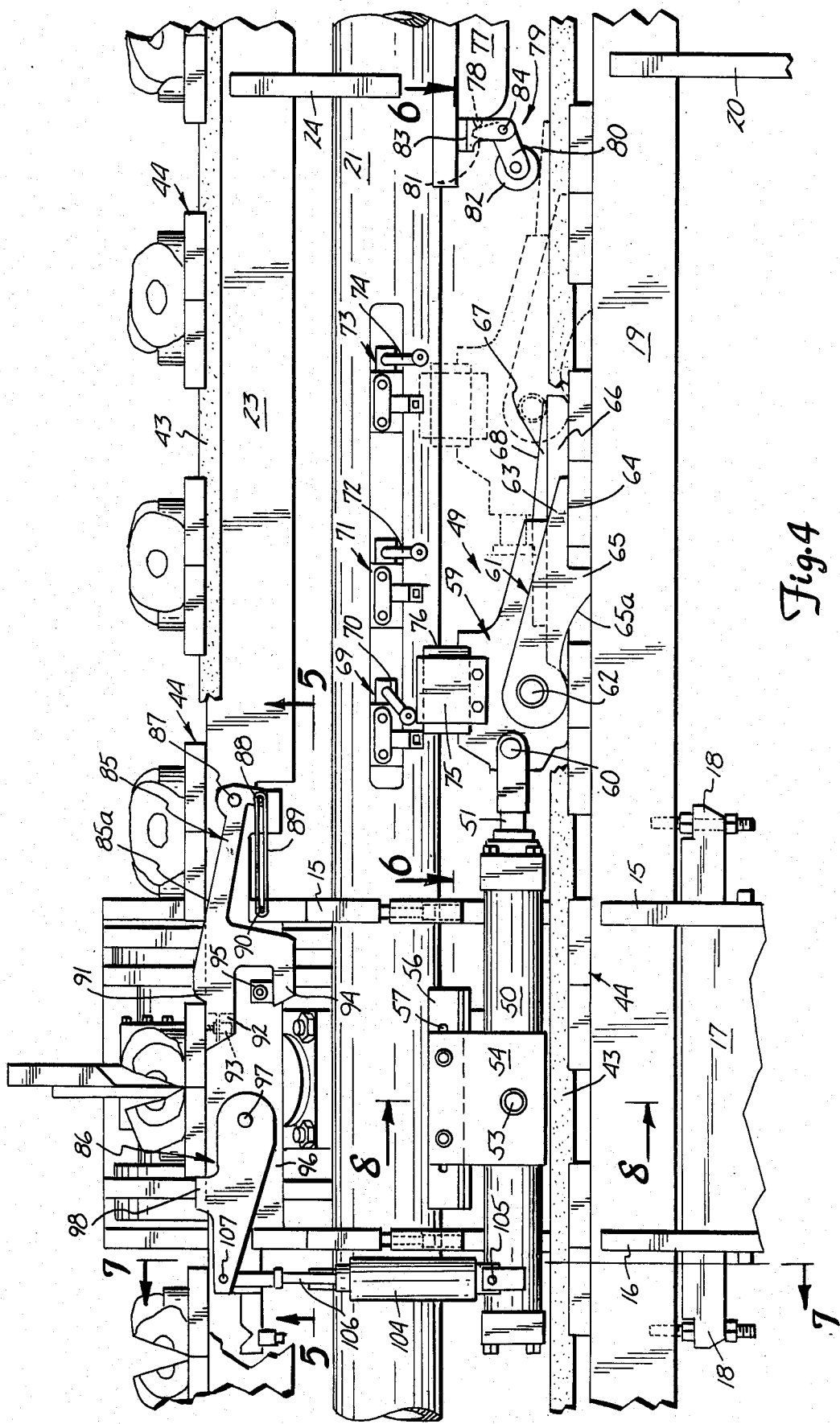
FIG. 4 is a fragmentary side elevational view of the apparatus on an enlarged scale showing details of construction thereof.
Figure 5:
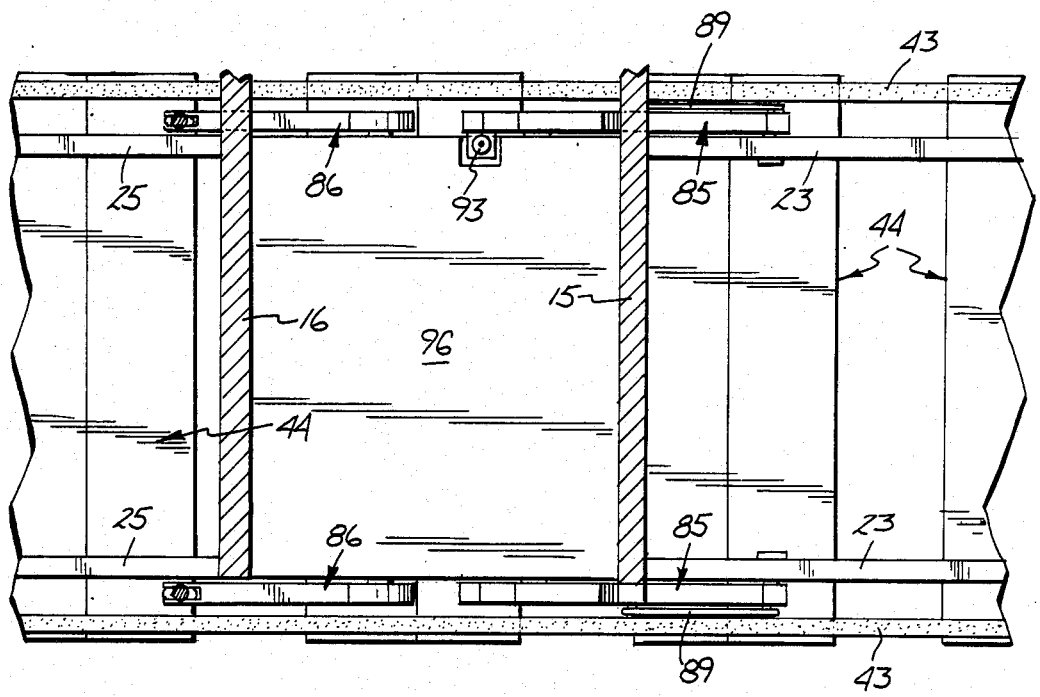
FIG. 5 is a cross-sectional view taken approximately along the lines 5—5 of FIG. 4 and looking in the direction of the arrows.
Figure 6:
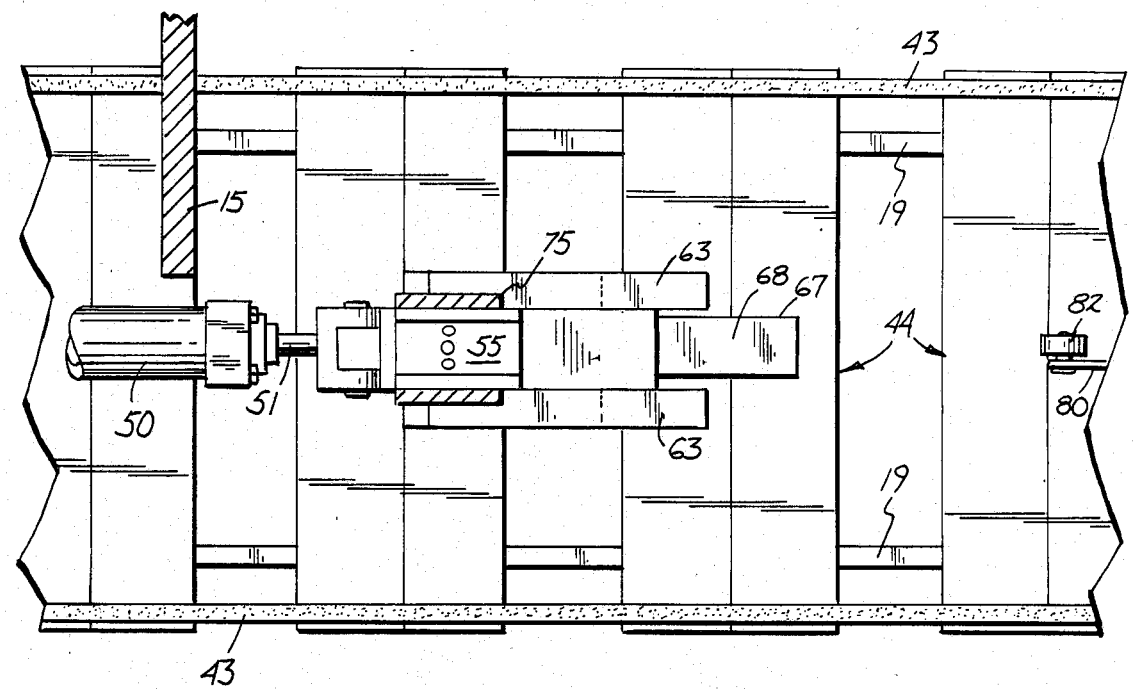
FIG. 6 is a cross-sectional view taken approximately along the lines 6—6 of FIG. 4 and looking in the direction of the arrows.

Means are provided for causing deceleration of the extension of the piston rod 51 to thereby provide a smooth operation during positioning of each head support member 44 in the cutting position. Referring now to FIGS. 2 and 4, it will be seen that this means includes a deceleration hydraulic valve 77 which is connected in flow controlling relation with respect to the hydraulic trunnion cylinder 50. The deceleration valve 77 is mounted on the tubular frame member 21 in spaced relation from the limit switch 73. The deceleration valve 77 is provided with an actuator element 78 adjacent one end thereof. The actuator element 78 is normally urged to a position which does not affect the rate at which the piston rod 51 is extended. However, when the actuator element 78 is urged inwardly or depressed, the decelerator valve is operable to decelerate extension of the piston rod 51.

Means are provided for operating the actuator element 78 and this means includes an L-shaped valve operator crank member 79 which includes an arm 80 integral with an arm 81. The arm 80 is provided with a roller 82 at one end thereof, and the crank member is pivotally mounted on a bracket 83 by a pivot 84. With this arrangement, it will be seen that the L-shaped crank member 79 is normally urged by the weight of the arm 80 and the roller 82 in a counterclockwise direction, as viewed in FIG. 4, so that the arm 81 is moved out of contact with the actuator element 78. However, as the piston rod 51 is extended, the roller will be engaged by the ramp member 67, which will cause the crank member 79 to pivot about the pivot 84 to urge the arm 81 into engaging relation with the actuator element 78. This actuates the deceleration valve and, therefore, slows the extension of the piston rod 51. When the piston rod 51 is retracted, the inclined cam surface 65a adjacent the dog 65 will cam over the head support members 44 until the piston rod 51 is in the fully retracted position. During this camming movement, the pawl 61 can pivot about its pivotal axis 62.

Referring again to FIGS. 1 and 2, it will be seen that the conveyor device 27 is shifted by the indexing conveyor mechanism 49 until each head support member along the upper run of the conveyor mechanism is successively moved to a cutting position CP. Means are provided for retaining each head support member at the cutting position to permit successive cutting or splitting of each head H. This means includes a pair of rear retainer members 85 and a pair of front retainer members 86 which cooperate with each other to hold each head support member in a predetermined position with respect to a cutting mechanism. Each of the rear retainer members 85 is of elongate construction pivotally connected at the rear end portion to one of the rear upper slide supports by a pivot 87 to permit vertical swinging movement of each of the rear retainer members relative to the associated slide support. Each rear retainer member 85 is also provided with a short arm 88 integral therewith and projecting downwardly therefrom, and each arm 88 has a pin affixed thereto, as best seen in FIG. 4. A flexible band 89 is positioned around the pin on the arm 88 and around a pin 90 mounted on the frame plate 15. With this arrangement, it will be seen that the rear retainer members 85 are urged in a clockwise or upward direction, as viewed in FIG. 4.

The rear pair of retainer members 85 each has a recessed front end which defines a retaining shoulder 91. It will be seen that the retaining shoulder 91 engages the outer edge of one of the slats of a head support member 44 to restrain the head support member against movement in a rearward or upstream direction. It will also be noted that the front end portion 92 of each rear retainer member has a valve 93 mounted thereon and the valve actuating element projects upwardly therefrom and is operated by engagement with the lower surface of a slat when one of the head support members is in the cutting position. Each rear retainer member also has an L-shaped stop engaging element 94 integrally formed therewith, and each stop engaging element is engageable with the stop 95 mounted on one side of a generally rectangular shaped anvil 96. The stop element for each rear retainer member limits upward swinging movement of the rear retainer member about its axis 87.

Each pair of front retainer members 86 is of elongate construction and each is pivotally connected to the anvil 96 by a pivot 97 to permit vertical swinging of the front retainer members about a horizontal axis. Each front retainer member is also provided with a slat engaging element 98 integrally formed therewith intermediate the ends thereof. The slat engaging element 98 on each front retainer member is adapted to engage the front slat of each head support member when the latter is in the cutting position. With this arrangement, it will be seen that the rear retainer members and the front retainer members, when in the retaining position, cooperate with each other to hold a head support member 44 in a precise predetermined position during the splitting operation. Means are provided for shifting the front retainer members 86 between an elevated retaining position and a lowered release position.

Figure 7:
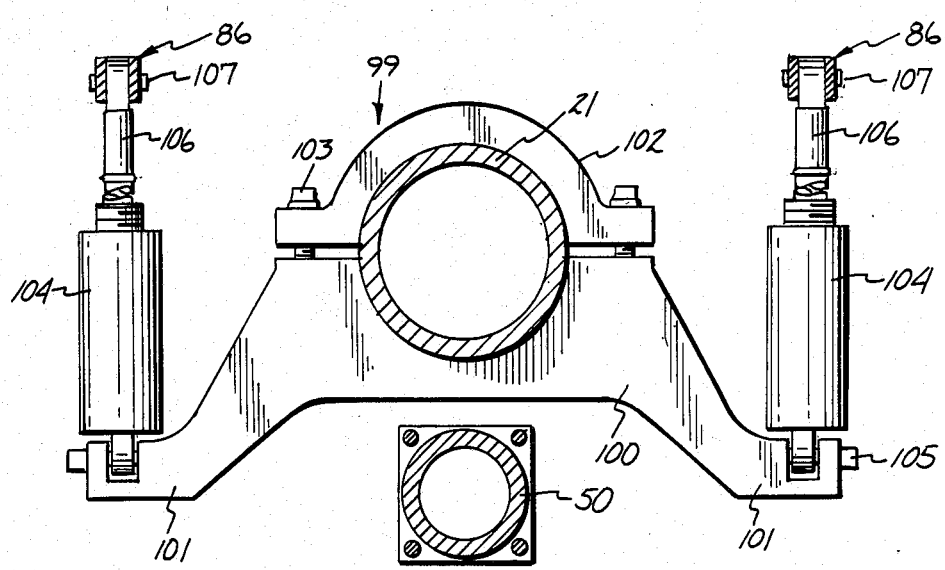
FIG. 7 is a cross-sectional view taken approximately along the lines 7—7 of FIG. 4 and looking in the direction of the arrows.

Referring now to FIG. 7, it will be seen that the central frame member 21 has a mounting bracket assembly 99 secured thereto which includes a lower bracket member 100 having a pair of arms 101 projecting outwardly therefrom. An arcuate upper clamping bracket 102 is secured to the lower clamping bracket by suitable bolts 103. The lower clamping bracket 100 has an arcuate recess therein and it will be seen that the bolts 103 clamp the upper and lower brackets against the central frame member 21.

A pair of double-acting pneumatic cylinders 104 are each pivoted to one of the bracket arms 101 by a pivot 105. Each double-acting pneumatic cylinder has a piston movable therein to which is connected a piston rod 106. The upper end portion of the piston rod 106 is connected to one of the front retainer members 86 adjacent the front end thereof. It will, therefore, be seen that, when the piston rod 106 is extended from a retracted position, the associated front retainer member will be swung upwardly about its pivot 97 to an elevated retaining position so that the slat engaging element 98 will engage an edge of the leading slat of one of the head support members 44. After the cutting operation, the piston rod 106 will be retracted to thereby release engagement of the slat engaging element 98 with the associated head support member, which permits movement of the conveyor mechanism by the indexing conveyor shifting mechanism.

The head splitting apparatus 10 includes a chopping or cutting device 108 which is vertically swingable between an elevated position and a lowered position. During the downward stroke, the cutting device is operable to split the head or skull H located at the cutting position. Referring now to FIGS. 1, 3, and 11, it will be seen that the cutting device 108 includes an elongate cutting arm 109 which is journaled about a pin 110 which extends through and is secured to the frame plates 15 and 16. In the embodiment shown, the cutting device 108 includes a pair of substantially similar sleeve members 111, each having an outturned radial flange 112 at the inner end thereof, as best seen in FIG. 11. These flanges are provided with openings therethrough to accommodate bolts 113 which engage in threaded recesses in the cutting arm 109. Thus, the sleeve members 111 are rigidly affixed to the cutting arm to move as a unit therewith.

It will be noted that suitable bearings 114 are interposed between the pin 110 and the sleeve members 111. It will also be noted that one of the sleeve members 111 has an arm 115 and an arm 116 rigidly mounted on the outer end portion thereof for movement therewith. It will further be noted that the other sleeve member 111 has an arm 117 rigidly mounted on the outer end portion thereof for movement therewith. The arms 115, 116 and 117 are of similar construction, and each depends from the associated sleeve member for movement therewith. The function of the arms will be more fully set forth hereinbelow.

The end of the cutting arm 109 is provided with a blade 118 which is of substantially flat construction and which is secured to the arm by suitable bolts 119. It will be noted that the arm 109 is provided with a plurality of slots through which the bolts 119 project to permit limited vertical adjustment of the blade 118 relative to the arm. The blade 118 is provided with a cutting edge 120 which engages and splits the animal head during the downward cutting stroke. It will be noted that the anvil 96 is provided with a cavity 96a which contains a Delrin support plate that supports the head support plate 44 during the splitting cycle.

Means are provided for vertically shifting the cutting arm 109 and blade 118 mounted thereon, and this means includes a double-acting hydraulic cylinder 121. Referring now to FIG. 3, it will be seen that the double-acting hydraulic cylinder 121 is mounted by a pivot 122 on a bracket 123 which extends between and is rigidly secured to the frame plates 15, 16. The hydraulic cylinder 121 is provided with a piston which has a piston rod 124 secured thereto for movement therewith. The outer end of the piston rod 124 is connected by a pivot 125 to the arm 109.

It will further be noted that a limit switch 127 having a switch arm 128 is mounted on a bracket secured to the plate 15. Another limit switch 129 having a switch arm 130 is also mounted on a bracket secured to the plate 15. The limit switches 127 and 129 are positioned adjacent each other so that the switch arm 128 is disposed in obstructing relation with respect to movement of the arm 115, while the switch arm 130 is disposed in obstructing relation with respect to the arm 116. It will, therefore, be seen that the switch arms are positioned so that the associated limit switches will be actuated during vertical movement of the cutting arm 109.

During operation of the apparatus, the heads H to be split will each be placed upon one of the support members 44 along the upper run of the endless conveyor and upstream of the cutting device 108. The apparatus is especially adaptable for splitting the heads of hogs. The lower jaw bone will have been removed from the skull and the head H will be placed with the forehead down. The flesh around the snout, cheek, and temple will be trimmed away, and each head will be positioned between a pair of spools 47 on each support member. Each head will also be positioned within the recess defined by the pair of slats comprising a support member.

In order for the cutting device 108 to be in an operative condition, a transparent housing or guard 132, which is pivotally mounted on the frame, must be in a lowered position. The guard 132 is formed of transparent Lexan and covers the cutting device, but may be raised to provide access to the components of the cutting device. It is pointed out that the guard 132 has openings in the side walls thereof to permit passage of the upper run of the conveyor along with the heads H mounted thereon. When the guard 132 is in the raised position, a limit switch 131 will be in an open condition, and this de-energizes operation of all of the components of the system. It will be noted that the limit switch 131 is mounted on the frame. However, when the guard 132 is in the lowered position, the guard mechanically actuates and closes the limit switch 131 to condition the apparatus for operation. A master switch or control lever (not shown) will be actuated to initiate the operational cycle. At the beginning of the operational cycle, the piston rod 51 for the trunnion cylinder 50 will be in the retracted position. The piston rod will be extended at the initiation of the cycle to therefor shift the guide support arm 59 in an advanced direction. The slat engaging dog 65 will engage the edge of one of the slats 44 and thereby move the conveyor through an indexed distance. In the embodiment shown, the cylinder 51 has an 18-inch stroke. As the piston rod 51 is advanced, the switch arms 70, 72, and 74 will be swung in a counterclockwise direction, as viewed in FIG. 4. Movement of the switch arm 50 in a counterclockwise direction does not actuate the limit switch 69, but this directional movement does actuate the limit switch 71. When the limit switch 71 is actuated, the piston rods 106 for the double-acting pneumatic cylinders 104 will be extended from a retracted position, thereby pivoting the front retainer members 86 from a lower position to an elevated locking position. When in this position, the slat engaging elements 98 will be in obstructing relation with respect to the support member 44, which is being moved into the cutting position.

The support member 44 being moved into the cutting position will engage the upper surface 85a of the rear retainer members 85 to cam the retaining members downwardly about their pivotal axis. As the support member reaches the cutting position, each rear retaining member 85 will be urged upwardly about its pivotal axis by the resilient flexible band 89. When this occurs, the limit switches 93 carried by these rear retainer members will engage the lower surface of the support member, which is moved in the cutting position, to close the limit switches 93 and thereby actuate the double-acting hydraulic cylinder 121 to retract the piston rod 124. In this regard, the piston rod 124 will have been in the extended position to thereby raise the arm 109. Retraction of the piston rod 124 will move the arm and blade downwardly to thereby cut and precisely split the head H, which is positioned on the support member located at the cutting position. When the arm 109 is in the fully lowered position, the limit switch 127 (FIG. 3) will be actuated to thereby operate the cylinder 121 and extend the piston rod 124 to raise the arm 109.

It is pointed out that, when the indexing trunnion cylinder 50 has been operated to fully extend the piston rod 51, the switch arm 74 of the limit switch 73 will be shifted in a counterclockwise direction to actuate the switch 73. This senses that the piston rod is in the fully extended position and actuates the cylinder 50 to retract the piston rod 51. As the piston rod reaches its fully retracted position, the switch arm 70 of the limit switch 69 will be moved in a clockwise direction to actuate switch arm 70. Actuation of the limit switch 69 detects that the piston rod is in the fully retracted position and conditions the apparatus for the next cycle.

When the piston rod 124 for the cutting device is extended a predetermined distance, the switch arm of the limit switch 129 is actuated to interrupt further travel of the piston rod. In this regard, the arm 109 will be raised a sufficient distance so that the next head to be split may pass below the blade 118. When limit switch 129 is actuated, the trunnion cylinder 50 is operated to again extend the piston rod 51 to shift the conveyor mechanism to begin the next cycle.

It will be appreciated that each head support member 44, when in the cutting position, will be engaged and restrained against movement in either direction by the front and rear retainer members. Therefore, further movement of the captured support member is completely restrained by the retainer members. The piston rod 51 is designed to over-travel 2 inches, so the resiliency of the endless conveyor belts 43 assures that head support members 44 will be positively urged against stops 98. It will further be appreciated that the final incremental distance of movement of the piston rod in the advanced direction is slowed by engagement of the arm 80 which actuates the deceleration valve 77 and decelerates final movement in this direction of the piston rod 51.

With this arrangement, it has been found that the heads may be precisely split by the cutting device during operation of the apparatus. The indexing drive means for the conveyor cooperates with the front and rear retainer members to permit precise positioning of the support members successively in the cutting position.

From the foregoing, it will be seen that I have provided a novel apparatus, which permits hog heads to be conveyed by a conveyor mechanism to a cutting station where the hog heads are positioned for optimum splitting by a cutter device.

Thus, it will be seen that I have provided a novel apparatus for splitting hog heads which functions in a more efficient manner than any heretofore known comparable system.

What is claimed is:

1. An apparatus for splitting animal heads for access to the brain, glands, and tissue contained therein, comprising:

a frame, conveyor means mounted on said frame and including a plurality of head support members interconnected together in spaced apart relation, each head support member supporting an animal head to be split thereon and each support member having leading and trailing edge portions, indexing drive means operatively connected with said conveyor means and being operable to advance the conveyor means a predetermined incremental distance whereby each head support member is successively advanced to a cutting station, shiftable stop means on said frame shiftable between locking and release positions, said stop means, when in the locking position, engaging said conveyor means after movement of the latter through a predetermined incremental advancement to precisely position one of the head support members at the cutting station, a shiftable cutting device mounted adjacent said conveyor means at the cutting station and being shiftable between an advanced cutting position and a retracted position, and means connected to the cutting device and being operable to shift the same between said advanced cutting position and said retracted position whereby, when the cutting device is shifted to the advanced cutting position, an animal's head mounted on a support member positioned at the cutting station will be split substantially in half by said cutting device.

2. The apparatus as defined in claim 1 wherein each of said head support members comprises a pair of substantially flat slats disposed in side-by-side relation.

3. The apparatus as defined in claim 1 wherein said conveyor means includes a pair of endless conveyor members, said head support members extending between and being connected with said endless conveyor members, said endless conveyor members and said head support members defining a horizontal endless conveyor having an upper horizontal run and a lower horizontal run.

4. The apparatus as defined in claim 3 wherein said indexing drive means engages and shifts one of said head support members along said lower horizontal run during each incremental advancement of the endless conveyor.

5. The apparatus as defined in claim 2 wherein each of said slats has a head retaining element thereon projecting therefrom engageable with a head to be split and cooperating with each other to hold the head in a predetermined position.

6. The apparatus as defined in claim 1 wherein said shiftable cutting device comprises a cutting blade, means pivotally connecting said blade on said frame for swinging movement of the blade between said cutting position and said retracted position.

7. The apparatus as defined in claim 1 wherein said conveyor means includes an endless conveyor having an upper horizontal run and a lower horizontal run, said indexing drive means engaging and shifting one of said head support members along said lower horizontal run during each incremental advancement of the endless conveyor.

8. The apparatus as defined in claim 3 wherein said endless conveyor members are formed of an elastic material.

9. The apparatus as defined in claim 1 wherein said stop means includes an upstream stop member and a downstream stop member, said upstream stop member engaging the trailing edge portion and said downstream stop member engaging the leading edge portion of the head support member located at the cutting station when said stop members are in the locking position.

10. The apparatus as defined in claim 9 and means connected with said downstream stop member and being operable to shift the latter to the locking and release positions.

11. The apparatus as defined in claim 9 and means connected with said upstream stop member to normally urge the same to the locking position, said upstream locking member being engaged by a head support member during movement of said conveyor means to urge the upstream locking member to the release position, said upstream locking member being urged into the locking position when a head support member is moved to the cutting station.

12. The apparatus as defined in claim 1 wherein said stop means includes a pair of upstream stop members mounted on said frame for shifting movement relative thereto, means connected with said stop members for shifting the same between locking and release positions, said locking members engaging the leading edge of a head support member located at the cutting station.

* * * * *